(12) United States Patent
Lopes et al.

(10) Patent No.: US 12,676,344 B2
(45) Date of Patent: Jul. 7, 2026

(54) ELECTROCHEMICAL CELLS AND METHODS OF MANUFACTURING THEREOF

(71) Applicant: UCHICAGO ARGONNE, LLC, Chicago, IL (US)

(72) Inventors: Pietro Papa Lopes, Woodridge, IL (US); Timothy Fister, Oak Park, IL (US); Susan J. Babinec, Midland, MI (US); Vojislav Stamenkovic, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 211 days.

(21) Appl. No.: 18/443,169

(22) Filed: Feb. 15, 2024

(65) Prior Publication Data

US 2024/0186592 A1     Jun. 6, 2024

Related U.S. Application Data

(63) Continuation of application No. 17/587,644, filed on Jan. 28, 2022, now Pat. No. 11,936,004.

(51) Int. Cl.
*H01M 10/42* (2006.01)
*H01M 10/12* (2006.01)
*H01M 10/44* (2006.01)

(52) U.S. Cl.
CPC ..... *H01M 10/4242* (2013.01); *H01M 10/128* (2013.01); *H01M 10/44* (2013.01)

(58) Field of Classification Search
CPC ............... H01M 10/06; H01M 10/128; H01M 10/4242; H01M 10/44; H01M 2300/0011; H01M 4/14; H01M 8/18; Y02E 60/10
See application file for complete search history.

(56) References Cited

U.S. PATENT DOCUMENTS

| | | | |
|---|---|---|---|
| 3,915,745 | A | 10/1975 | Ikeda et al. |
| 5,612,148 | A | 3/1997 | Zito |

(Continued)

FOREIGN PATENT DOCUMENTS

| | | |
|---|---|---|
| CN | 105845960 A | 8/2016 |

OTHER PUBLICATIONS

Collins, et al., "A novel flow battery: A lead acid battery based on an electrolyte with soluble lead(II) Part VIII. The cycling of a 10 cm x 10 cm flow cell," Journal of Power Sources 195(6), pp. 1731-1738 (2010).

(Continued)

*Primary Examiner* — Victoria H Lynch
(74) *Attorney, Agent, or Firm* — Foley & Lardner LLP

(57) ABSTRACT

An electrochemical cell includes a housing, a positive electrode substrate disposed within a first electrode chamber of the housing, a negative electrode substrate disposed within a second electrode chamber of the housing, and a separator may be disposed within the housing between the first electrode chamber and the second electrode chamber. A method further includes pumping a manufacturing electrolyte through the positive electrode portion around the positive electrode substrate. The method further includes applying a first electrical signal to the positive electrode substrate so as to electrochemically fabricate one or both of an active material the negative electrode substrate to form a negative electrode and/or an active material on the positive electrode substrate, thereby forming a positive electrode.

20 Claims, 3 Drawing Sheets

100a

Provide an electrochemical cell having a positive electrode substrate and a negative electrode substrate — 102a Pump a manufacturing electrolyte to electrodeposit an active material on the negative electrode substrate — 104a Apply an electrical signal to the negative electrode substrate — 106a Pump a first charge operation electrolyte — 108a

(56) References Cited

U.S. PATENT DOCUMENTS

| | | | |
|---|---|---|---|
| 5,650,239 A | 7/1997 | Lex et al. | |
| 8,048,555 B2 | 11/2011 | Darcy et al. | |
| 9,722,236 B2 | 8/2017 | Sathrum | |
| 10,615,441 B2 * | 4/2020 | Kaku ..................... | H01M 8/18 |
| 2004/0151977 A1 | 8/2004 | Morrisey et al. | |
| 2006/0063065 A1 | 3/2006 | Clarke et al. | |
| 2007/0111043 A1 | 5/2007 | Stocchiero | |
| 2010/0003545 A1 | 1/2010 | Horne et al. | |
| 2010/0036450 A1 | 2/2010 | Axelrod et al. | |
| 2012/0135282 A1 | 5/2012 | La Mantia et al. | |
| 2013/0011702 A1 | 1/2013 | Horne et al. | |
| 2013/0084506 A1 | 4/2013 | Chang et al. | |
| 2014/0060666 A1 * | 3/2014 | Evans ............... | H01M 8/04186 137/260 |
| 2014/0220463 A1 | 8/2014 | Daniel | |
| 2014/0266058 A1 | 9/2014 | Sathrum | |
| 2015/0086896 A1 | 3/2015 | Chang et al. | |
| 2015/0099206 A1 | 4/2015 | Horne et al. | |
| 2015/0318580 A1 | 11/2015 | Fukunaga et al. | |
| 2016/0020477 A1 | 1/2016 | Smeltz et al. | |
| 2016/0293992 A1 | 10/2016 | Song et al. | |
| 2017/0271705 A1 | 9/2017 | Kim et al. | |
| 2018/0198148 A1 | 7/2018 | Pozvonkov et al. | |
| 2019/0237792 A1 | 8/2019 | Ikeuchi | |
| 2019/0280316 A1 * | 9/2019 | Min ....................... | H01M 8/18 |
| 2020/0076017 A1 | 3/2020 | Shen et al. | |
| 2020/0106118 A1 | 4/2020 | Wang et al. | |
| 2021/0143463 A1 | 5/2021 | Song et al. | |
| 2021/0143488 A1 | 5/2021 | Kong et al. | |
| 2023/0144710 A1 | 5/2023 | Saraidaridis et al. | |

OTHER PUBLICATIONS

Consortium for Battery Innovation, "An innovation roadmap for advanced lead batteries: Technical specifications and performance improvements," retrieved from https://batteryinnovation.org/wp-content/uploads/2019/09/CBIRoadmap_FINAL.pdf, 32 pages (2019).

Hazza, et al., "A novel flow battery—A lead acid battery based on an electrolyte with soluble lead(II): IV. The influence of additives," Journal of Power Sources 149, pp. 103-111 (2005).

International Search Report & Written Opinion on PCT/US2022/053872 dated Apr. 12, 2023, 10 pages.

International Search Report & Written Opinion on PCT/US2022/053880 dated Apr. 12, 2023, 7 pages.

Pletcher & Wills, "A novel flow battery—A lead acid battery based on an electrolyte with soluble lead(II): III. The influence of conditions on battery performance," Journal of Power Sources 149, pp. 96-102 (2005).

* cited by examiner

200

204

202

ELECTROCHEMICAL CELLS AND METHODS OF MANUFACTURING THEREOF

CROSS-REFERENCE TO RELATED APPLICATIONS

This application is a continuation of U.S. patent application Ser. No. 17/587,644, filed Jan. 28, 2022, the contents of which is incorporated by reference in its entirety.

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to electrochemical energy storage cells and methods of manufacturing the same.

BACKGROUND

Lead acid batteries are one of the oldest types of electrochemical energy storage devices and have been incrementally improved for more than one hundred years in many ways. Lead is an economically attractive and abundant raw material with a well-established supply chain, and lead acid batteries are non-flammable. Lead acid cells can be used in stationary storage systems but have a short calendar and cycle life, especially with deep charge/discharge cycling as well as at higher temperatures ($\geq 25°$ C.). Existing lead acid cells are generally not ideally suited for large scale stationary storage, including grid storage. For example, a typical grid storage system for solar/storage or wind/storage hybrid systems needs a 20-year calendar life, which is 7,300 cycles at 1 cycle/day. Additionally, economics dictate that these cycles should be high depth-of-discharge ("DOD") in order to fully utilize the capital investments and impart cost-effectiveness. Several important lifecycle lead acid issues are related to acid stratification during charge and discharge which causes local variation in material utilizations and electrolytic efficiencies, these issues include positive grid corrosion and active material softening and negative electrode sulfation, which lead to compromised electrode morphologies, loss of active material utilization, and non-uniform current distribution related to active material non-uniformities.

SUMMARY

Embodiments described herein relate generally to electrochemical energy storage cells for use in situations that require high cycle life and high depth of charge/discharge and do not require especially high gravimetric energy density, such as stationary storage systems, and relate in particular, to electrochemical energy storage cells and methods of making the same.

At least one embodiment relates to a method. The method includes providing an electrochemical cell. The electrochemical cell includes a housing, a negative electrode substrate disposed within a first electrode chamber of the housing, a positive electrode substrate disposed within a second electrode chamber of the housing, and a separator disposed within the housing between the first electrode chamber and the second electrode chamber. The method further includes pumping a first manufacturing electrolyte through the first electrode chamber around the negative electrode substrate. The method further includes pumping a second manufacturing electrolyte through the second electrode chamber around the positive electrode substrate. The method further includes applying a first electrical single so as to electrochemically fabricate an active material on the electrode substrate, forming a negative active material on the first electrode substrate and a positive active material on the second electrode substrate. The method further includes pumping a first charge operation electrolyte having a first charge operation concentration at a first charge operation flow rate through the first electrode chamber. The method further includes pumping a second charge operation electrolyte having a second charge operation concentration at a second charge operation flow rate through the second electrode chamber.

Another embodiment relates to an electrochemical cell assembly. The electrochemical cell assembly includes an electrochemical cell. The electrochemical cell includes a housing, a negative electrode substrate disposed within a first electrode chamber of the housing, a positive electrode substrate disposed within a second electrode chamber of the housing, and a separator disposed in the housing between the first electrode chamber and the second electrode chamber. The electrochemical cell assembly further includes a pumping assembly configured to pump a plurality of electrolytes the first electrode chamber and/or the second electrode chamber. The plurality of electrolytes includes one or more manufacturing electrolytes formulated to electrochemically fabricate an active material on an electrode, for example one or both of fabrication of a negative active material on the negative electrode substrate to form a negative electrode and/or deposition of a positive active material on the positive electrode substrate so as to form a positive electrode. The plurality of electrolytes further may comprise a first charge operation electrolyte having a first charge concentration.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figures 1A, 1B:
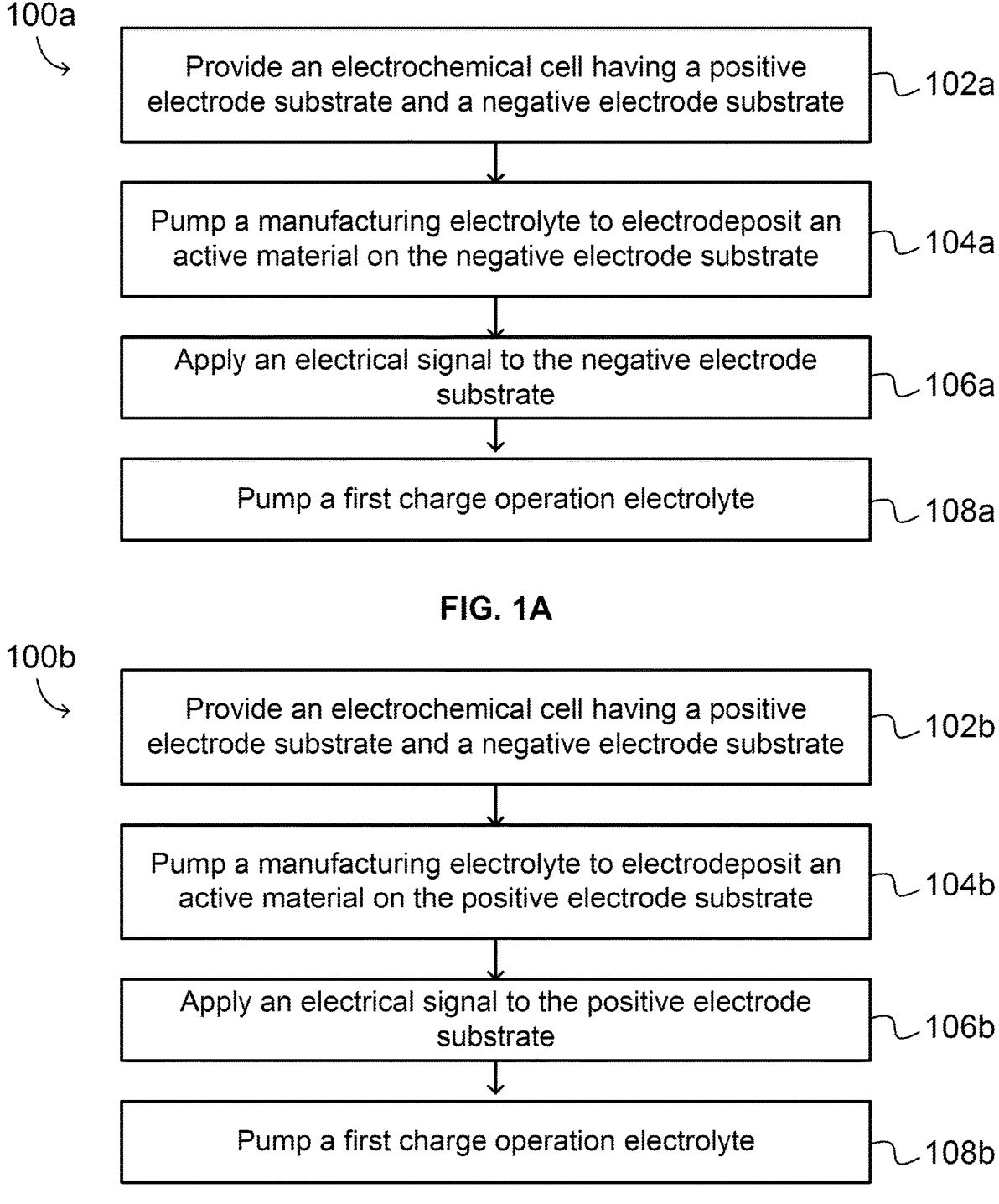
FIGS. 1A and 1B are schematic flow diagrams of methods of manufacturing an electrochemical cell, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to electrochemical energy storage cells for use in stationary storage systems and methods of making the same.

Traditionally, lead acid cells have been improved with electrolyte modifications, cell modifications, and electrode modifications. However, the chemistry and electrochemistry in lead acid batteries are difficult to co-optimize due to complex and often competing demands on electronic, mass transport and chemical reversibility and speciation of active materials. A chemical state of charge is defined by the molar fraction of lead sulfate within the electrode with respect to lead and/or lead dioxide phases. The chemical state of charge of the electrodes may be often not balanced. For example, after formation, the positive electrode is often not fully charged; similarly, sulfation on the negative electrode can drive the negative to lower relative chemical state of charge ("SOC"). Furthermore, the optimal acid concentration for each electrode's chemical state of charge is often different for charge versus discharge and for positive versus negative, and it may vary for various depths of discharge and targeted coulombic efficiency. A singular (i.e., shared) electrolyte cannot balance that trade-off sufficiently.

Current manufacturing processes for lead acid battery electrodes are energy intensive and time demanding. In use, these electrodes suffer degradation within a limited number of charge/discharge cycles. The extent of the degradation is heavily dependent on usage conditions, temperature, and other operational conditions, leading to device failure and ultimate recycling that is also energy intensive. In general, light use or low utilization of the capacity increases lifetime, which is inherently detrimental to lead-acid deployment in stationary energy storage applications since this increases the overall energy storage use normalized to capital cost.

Therefore, the current lifecycle of a lead acid battery relies on manufacturing, physical assembly, operation until critical failure, physical removal and disassembly of materials, and recycling, and then the cycle reinitiates. While this cycle functions with overall 99% lead content recyclability rate, the performance and lifetime limitations increase net cost and are severe impediments for this battery chemistry to survive in the long duration energy storage solution markets.

Various embodiments of the electrochemical cell described herein may provide one or more benefits including, for example: (1) extending the cell lifetime; (2) allowing the electrode-manufacturing step to occur within the battery casing; (3) reducing manufacturing time, cost, and waste; (4) meeting the operational time frame of a stationary storage system; (5) increasing cell efficiency; (6) reducing or eliminating local concentration gradients; (7) optimizing the electrolyte used for different parts of the cycle; (8) preventing comprised electrode morphologies; (9) stabilizing the electrodes; and (10) reducing the lifetime energy storage cost as $/kwh lifetime.

Embodiments of the present disclosure are discussed in the context of making, regenerating, and/or reconditioning an electrochemical cell. Specific embodiments utilize one or more of a first manufacturing electrolyte, a second manufacturing electrolyte, a first charge operation electrolyte, a second charge operation electrolyte, a first discharge operation electrolyte, a second discharge operation electrolyte, a first open circuit operation electrolyte, a second open circuit operation electrolyte, a first regeneration electrolyte, and a second regeneration electrolyte. These electrolytes may be associated with a specific electrode substrate, such as the negative electrode substrate and the positive electrode substrate and with a specific portion of the electrochemical cell's life cycle: manufacture, charge, discharge, open state, and regeneration.

In some embodiments, a manufacturing electrolyte may be flowed into a lead acid cell housing by an electrochemical or chemical deposition process in order to electrochemically or chemically deposit an active material on an electrode substrate, leading to an in-situ electrode manufacturing. Similarly, important chemical processes may also occur throughout the electrochemical processes. Utilization of the electrolyte flow and switching of composition of the electrolytes during various stages of use is a feature in the electrochemical cell allows the electrode manufacturing step to occur in-situ within the battery final casing which simplifies equipment requirements and as well reduces manufacturing plant capital and operational costs, including associated transportation and labor costs. Then, one or more operation electrolytes may be optimized to flow through the cell during its lifetime. The ability to in-situ manufacture the active electrodes also enables in-situ regeneration of the electrodes or the cell after reaching what would otherwise be considered end-of-life performance or a lower performance threshold. A regeneration electrolyte may be pumped through the electrochemical cell and may be driven by an electrical signal in order to accomplish the regeneration process, which may or may not include removing all or some of the spent active materials, from both the positive and from the negative, wherein spent active material is defined as being readily irrecoverable by chemical and/or electrochemical means. The combination of electrochemical-based manufacturing methods and tailored electrolyte flow capabilities and multiple electrolytes allow implementation of a regeneration protocol, which effectively extends battery lifetime without requirements of physical disassembly or extra cost, extra energy, or extra effort associated with a recycle followed by a completely new manufacturing process and installation. This type of solution is particularly advantageous to longer-term stationary applications, such as stationary energy storage, bypassing the need for physical replacement of cells by enabling in-situ regeneration as needed, while meeting the 20 or more years operational time frame.

Described herein are system and methods relating to electrolyte concentration of the first manufacturing electrolyte, the second manufacturing electrolyte, the first charge operation electrolyte, the second charge operation electrolyte, the first discharge operation electrolyte, the second discharge operation electrolyte, the first open circuit operation electrolyte, the second open circuit operation electrolyte, the first regeneration electrolyte, the second regeneration electrolyte.

The operation by one of these processes may utilize a different electrolyte pumped through the electrochemical cell as further described below. The electrochemical cell may comprise a negative electrode substrate and a negative active material deposited on the negative electrode substrate, and a positive electrode substrate and a positive active material deposited on the positive electrode substrate. The negative electrode substrate may include lead, carbon, titanium, platinum, silicon, any other suitable material, or combinations thereof in a concentration in a range of about 0.01 vol % to about 99.99 vol %, inclusive (e.g., 0.01, 0.1, 1, 5, 10, 25, 50, 75, 99, or 99.99 vol %, inclusive). In some embodiments, the negative active material may include metallic lead, lead sulfate, lead oxide, lead oxide, lead carbonate, combinations thereof, or any other suitable material. The positive electrode substrate may include lead, carbon, tin, titanium, platinum, silicon, any other suitable material, or combinations thereof in a concentration in a range of about 0.01 vol % to about 99.99 vol %, inclusive (e.g., 0.01, 0.1, 1, 5, 10, 25, 50, 75, 99, or 99.99 vol %, inclusive). In some embodiments, the positive active material may include lead, lead dioxide, lead oxide, lead sulfate, lead monoxide, lead hydroxide, combinations thereof, or any other suitable material.

The negative electrode substrate and/or the positive electrode substrate may be disposed within a housing, such as a battery casing. The battery casing may house a plurality of cells each having a negative electrode substrate, positive electrode substrate, and electrolyte.

In some embodiments, a volume of the housing is continuous between the first electrode chamber and the second electrode chamber, allowing circulating of an electrolyte that is functional for reactions at both the first electrode and the second electrode. In some embodiments, the electrochemical cell further includes a separator disposed between the negative active material and the positive active material, defining a first electrode chamber and a second electrode chamber, respectively. In some embodiments, each of the first electrode chamber and the second electrode chamber is in ionic communication through the separator, providing physical separation of the electrodes and electrolytes associated with the first electrode chamber and the second electrode chamber. The separator may include cellulose, polyvinyl chloride, organic rubber, polyolefin, polyethylene, polypropylene, glass fiber, any other suitable material, or combinations thereof.

In some embodiments, the electrochemical cell assembly includes a sensing electrode or other types of sensors or a plurality of sensing devices configured to monitor the electrolyte concentration of the first manufacturing electrolyte, the second manufacturing electrolyte, the first charge operation electrolyte, the second charge operation electrolyte, the first discharge operation electrolyte, the second discharge operation electrolyte, the first open circuit operation electrolyte, the second open circuit operation electrolyte, the first regeneration electrolyte, the second regeneration electrolyte, any other electrolyte in the electrochemical cell assembly, or any combinations thereof. The plurality of sensing devices may be an acoustic sensor, a sensor to detect chemical drift, a sensor to detect electrical drift, or any other suitable sensor.

A pumping system may be utilized to pass an electrolyte through the electrochemical cell, for example, through one or both of the first electrode chamber or the second electrode chamber. Any suitable pumping system may be used for the pumping systems described herein, such as rotary lobe pumps, progressive cavity pumps, rotary gear pumps, piston pumps, diaphragm pumps, screw pumps, gear pumps, hydraulic pumps, gravity feed pumps, or any other suitable pump. The pumping system may be utilized with the first manufacturing electrolyte, the second manufacturing electrolyte, the first charge operation electrolyte, the second charge operation electrolyte, the first discharge operation electrolyte, the second discharge operation electrolyte, the first open circuit operation electrolyte, the second open circuit operation electrolyte, the first regeneration electrolyte, the second regeneration electrolyte, any other electrolyte in the electrochemical cell assembly, or any combinations thereof.

Any of the electrolytes may be pumped into the cell via an inlet, and the inlet may comprise a manifold in communication with the housing. The manifold may include an inlet associated with each of the first electrode chamber and the second electrode chamber. Alternatively, a manifold may be associated with each electrode chamber inlet and a manifold may be associated with each of the electrode chamber outlet. In yet another embodiment, the inlet may be associated with one of the first electrode chamber or the second electrode chamber, where the electrode is able to flow from one chamber to the other. In some embodiments, the electrolyte may be pumped into the first electrode chamber only, the second electrode chamber only, or pumped to flow into both electrode chambers. The electrolyte may be the first manufacturing electrolyte, the second manufacturing electrolyte, the first charge operation electrolyte, the second charge operation electrolyte, the first discharge operation electrolyte, the second discharge operation electrolyte, the first open circuit operation electrolyte, the second open circuit operation electrolyte, the first regeneration electrolyte, the second regeneration electrolyte, any other electrolyte in the electrochemical cell assembly, or any combinations thereof. For example, in some embodiments, the manufacturing electrolyte may be pumped through the housing of the electrochemical cell into the first electrode chamber facilitating electrochemical fabrication of the negative active material on the negative electrode substrate, forming a negative electrode. In one embodiment, the manufacturing electrolyte is pumped into the second electrode chamber of the electrochemical cell facilitating electrochemical fabrication of the positive active material on the positive electrode substrate, forming a positive electrode.

In some embodiments, the manufacturing electrolyte may be pumped through the housing of the electrochemical cell in order to deposit the negative active material on the negative electrode substrate. In one embodiment, the manufacturing electrolyte is pumped into the second electrode portion of the electrochemical cell in order to deposit the active material on the positive electrode substrate so as to form a positive electrode. In some embodiments, the manufacturing electrolyte may be pumped through the entirety of the housing around and/or through both the first electrode chamber and the second electrode chamber (respectively, positive active material and negative active material).

In some embodiments, the electrode substrate (positive, negative or both) is porous, and an electrolyte is flowed through pores of the electrode substrate and may also be flowed around the electrode substrate. In such embodiments, the manufacturing electrolyte may be flowed up through, down through, or across through the electrode substrate. As described below with respect to FIG. 3, a first electrode chamber 318 may include a first flow inlet 322 and a first flow outlet 324 configured to allow the flow of an electrolyte. Further, the electrochemical cell may include a gap spacer, such as first gap spacer 308, configured to control the electrode gap and/or allow for flow over active material that is impermeable. In some embodiments, the electrode substrate is impermeable, and the manufacturing electrolyte may be flowed around the electrode substrate or around a face of the electrode substrate.

Some embodiments to a method of manufacturing an electrochemical cell are illustrated in FIGS. 1A-1B. As shown in FIG. 1A, the method 100a includes providing an electrochemical cell with electrodes, a positive electrode substrate, and a negative electrode substrate at operation 102a. The method 100a continues to operation 104a, in which a first manufacturing electrolyte is pumped through the electrochemical cell, for example, via a pump, to electrochemically fabricate an active material on the negative electrode substrate. The method 100a continues to operation 106a, in which a first electrical signal is applied to the negative electrode substrate. The method 100a continues to operation 108a, in which a first charge electrolyte is pumped through the electrochemical cell, for example, via a pump. FIG. 1B shows a method for the manufacture of a positive active materials. The method 100b includes operation 104b, in which a second manufacturing electrolyte is pumped through the electrochemical cell (e.g., via a pump) to electrochemically fabricate an active material on the positive electrode substrate. The method 100b continues to operation 106b, in which an electrical signal is applied to the positive electrode substrate. The method 100b continues to operation 108b, in which a first charge electrolyte is pumped through the electrochemical cell, for example, via a pump. In one embodiment, the pumping of the first manufacturing electrolyte at operation 104a occurs at the same time as the pumping of the second manufacturing electrolyte at operation 104b, forming, respectively, the negative active material and the positive active material.

With regard to manufacture of one or both of a negative electrode and/or a positive electrode, as illustrated in FIGS. 1A-1B, the first electrical signal may be applied to an electrode substrate. In some embodiments, the first electrical signal may be an AC signal, a DC signal, an arbitrary waveform, any other suitable electrical signal, or combinations thereof, and may be in the form of potential or current control, or mixtures of the two types. For example, as shown in FIG. 1A, first electrical signal may be configured to cause the deposition of the negative active material on the negative electrode substrate. In a further example, as shown in FIG. 1B, first electrical signal may be configured to cause the deposition of the positive active material on the positive electrode substrate.

Figure 2:
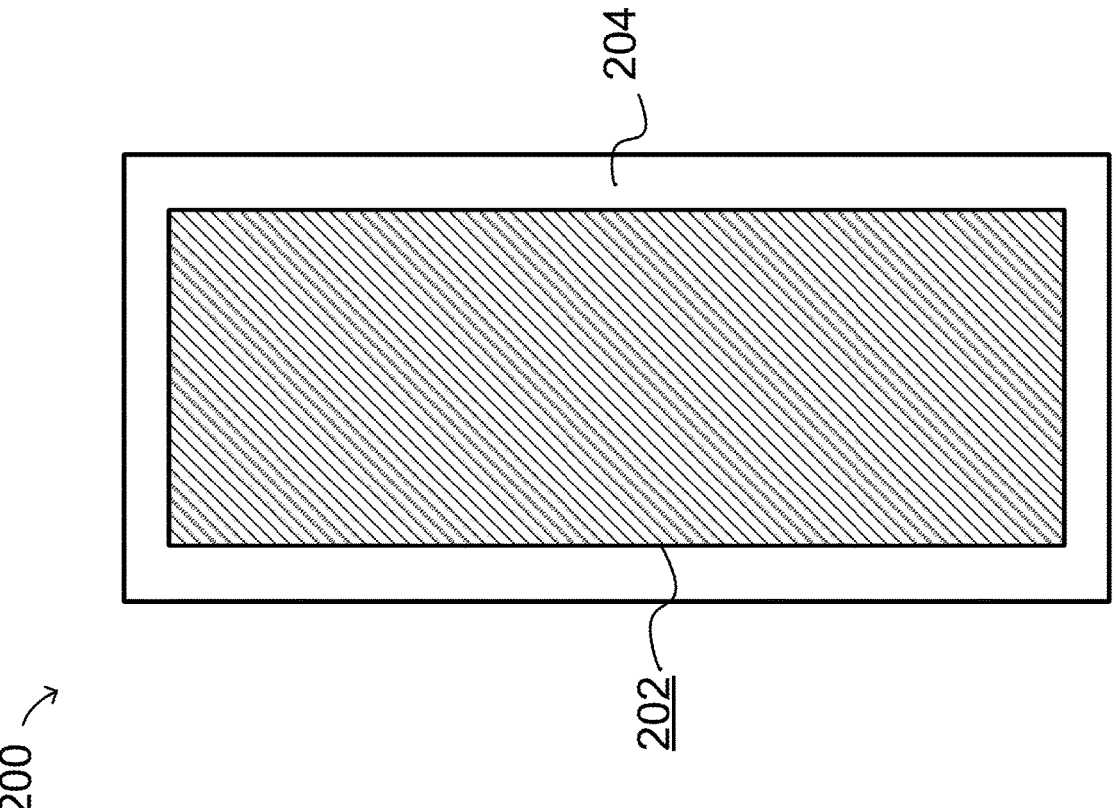
FIG. 2 is schematic block diagram of an electrode with an electrode substrate and an active material, according to an embodiment.

With reference to the manufacturing electrolyte flow, FIG. 2 is a schematic block diagram of an electrode 200 with an electrode substrate 202 formed via operations 104a-106a/104b-106b of the method 100a/100b. In some embodiments, the electrode substrate 202 is porous. In such embodiments, the formed electrode 200 may be porous. In some embodiments, the electrode 200 is a positive electrode, and the electrode substrate 202 is a positive electrode substrate. The positive electrode and the positive electrode substrate are substantially similar to the positive electrode and the positive electrode substrate discussed in the method 100b. In some embodiments, the electrode 200 is a negative electrode, and the electrode substrate 202 is a negative electrode substrate. The negative electrode and the negative electrode substrate are substantially similar to the negative electrode and the negative electrode substrate discussed in the method 100a.

In some embodiments, the electrode substrate 202 may include lead, carbon, titanium, platinum, silicon, any other suitable material, or combinations thereof in a concentration in a range of about 0.01 vol % to about 99.99 vol %, inclusive (e.g., 0.01, 0.1, 1, 5, 10, 25, 50, 75, 99, or 99.99 vol %, inclusive). An active material 204 may be electrodeposited on the electrode substrate 202. The active material 204 may be Pb, $PbO_2$, any other suitable material, or combinations thereof. In some embodiments, the active material 204 is uniformly deposited on the electrode substrate 202.

Figure 3:
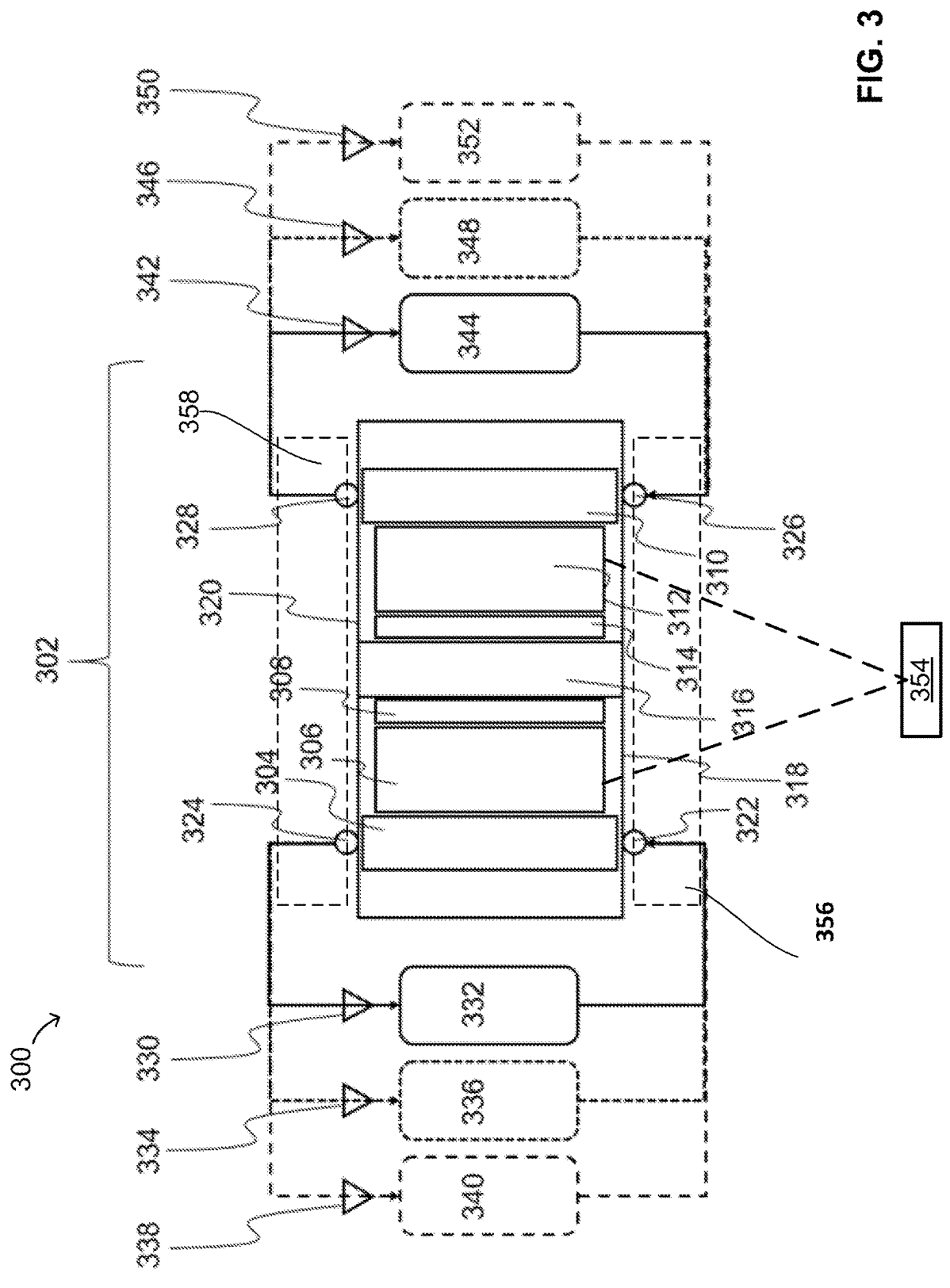
FIG. 3 is a schematic block diagram of an electrochemical cell assembly, according to an embodiment.

FIG. 3 is a schematic block diagram of an electrochemical cell assembly 300, in accordance with some embodiments. The electrochemical cell assembly 300 includes an electrochemical cell with a housing 302. The electrochemical cell assembly 300 may be operated using the operations described with respect to the method 100. The housing 302 may include a battery casing. The electrochemical cell assembly 300 may also include a negative electrode substrate 306 with a negative active material so as to form a first electrode disposed within the housing 302, and a positive electrode substrate 312 with a positive active material so as to form a second electrode disposed within the housing as the cathode during charge/recharge. The electrochemical cell assembly 300 may be operated using operations described with respect to the method 100a/100b. The positive electrode substrate 312 may include lead, carbon, titanium, platinum, silicon, any other suitable material, or combinations thereof in a concentration in a range of about 0.01 vol % to about 99.99 vol %, inclusive (e.g., 0.01, 0.1, 1, 5, 10, 25, 50, 75, 99, or 99.99%, inclusive). The negative electrode substrate 306 may include lead, carbon, titanium, platinum, silicon, any other suitable material, or combinations thereof in a concentration in a range of about 0.01 vol % to about 99.99 vol %, inclusive (e.g., 0.01, 0.1, 1, 5, 10, 25, 50, 75, 99, or 99.99 vol %, inclusive). In some embodiments, the positive electrode substrate 312 and/or the negative electrode substrate 306 are porous. In some embodiments, the positive electrode substrate 312 and/or the negative electrode substrate 306 are impermeable.

The electrochemical cell assembly 300 may also include a separator 316 disposed within the housing 302 between the positive electrode substrate 312 and the negative electrode substrate 306, in some embodiments. In other embodiments, the electrochemical cell assembly 300 does not include the separator 316. The separator 316 may be comprised of cellulose, polyvinyl chloride, organic rubber, polyolefins, polyethylene, polypropylene, any other suitable material, or combinations thereof. The separator 316 divides the housing 302 into two chambers: a first electrode chamber 318 and a second electrode chamber 320. Each of the first electrode chamber 318 and the second electrode chamber 320 may be a cavity or a void space.

In one embodiment, the first electrode chamber 318 includes a first flow inlet 322 and a first flow outlet 324 configured to allow the flow of an electrolyte. The first electrode chamber 318 may further include a first flow field 304 for electrolytes to flow through and a first gap spacer 308 configured to control the electrode gap and/or allow for flow over active material that is impermeable. A fluid may be pumped through the first flow field 304 and/or the first gap spacer 308. The first flow field 304 and the first gap spacer 308 may be any suitable shape, such as, but not limited to, rectangular, circular, triangular, trapezoidal, or any combination thereof, and may be made from any suitable material, such as, but not limited to, plastic, metal, ceramic, or combinations thereof.

In one embodiment, the second electrode chamber 320 includes a second flow inlet 326 and a second flow outlet 328 configured to allow the flow of an electrolyte. The second electrode chamber 320 may further include a second flow field 310 for electrolytes to flow through and a second gap spacer 314 configured to control an electrode gap and/or allow for flow over active material that is impermeable. A fluid may be pumped in the second flow field 310 and/or the second gap spacer 314. The electrode gap may be a space in between the negative active material the negative electrode substrate 306) and the positive active material (the positive electrode substrate 312). The second flow field 310 and the second gap spacer 314 may be any suitable shape, such as, but not limited to, rectangular, circular, triangular, trapezoidal, or any combination thereof, and may be made from any suitable material such as, but not limited to, plastic, metal, ceramic, or combinations thereof. The electrochemical cell assembly 300 may further include an inlet manifold 356 associated with each of first flow inlet 322 and the second flow inlet 326. The electrochemical cell assembly 300 may further include an outlet manifold 358 associated with each of first flow outlet 324 and the second flow outlet 328.

The electrochemical cell assembly 300 may contain at least six electrolytes, each stored in their own electrolyte reservoir. In some embodiments, the electrochemical cell assembly 300 may include at least ten electrolytes, each stored in their own electrolyte reservoir. It is understood that the number of electrolytes may be more or less than six electrolytes and can include any number of electrolytes in order to optimize the lifetime and operation of the electrochemical cell. Each electrolyte reservoir may be associated in fluid communication with the inlet manifold.

Manufacturing Operation

With reference to FIG. 3, the electrochemical cell assembly 300 may include an electric signal generator 354. The electric signal generator 354 may be electrically coupled to and may apply an AC, DC, or arbitrary waveform signal in the form of potential or current control to the positive electrode substrate 312, the negative electrode substrate 306, or both the positive electrode substrate 312 and the negative electrode substrate 306. It is understood that any other suitable electric signals can be applied, such as combinations of AC, DC, potential control, and current control with multiple stages. In one embodiment, the electric signal generator 354 is in communication one or both of the inlet manifold and the outlet manifold to control the pumping of electrolytes through the electrochemical cell. The electric signal generator 354 is configured to control the deposition of the active materials to the positive electrode substrate 312 or the negative electrode substrate 306.

The electrochemical cell assembly 300 may further include a first manufacturing electrolyte stored in a first manufacturing electrolyte reservoir 332. The first manufacturing electrolyte may be pumped through the first electrode chamber 318 such that the first manufacturing electrolyte flows around and/or through the negative electrode substrate 306 in order to electrochemically or chemically deposit a negative active material on the negative electrode substrate 306, thereby forming a negative electrode. In some embodiments, the negative electrode substrate 306 is porous and the first manufacturing electrolyte is flowed through pores of the negative electrode substrate 306 and may also be flowed around the negative electrode substrate 306. In such embodiments, the first manufacturing electrolyte may be flowed up through, down through, or across through the negative electrode substrate 306. In some embodiments, the negative electrode substrate 306 is impermeable, and the first manufacturing electrolyte may be flowed around the negative electrode substrate 306 or a face of the negative electrode substrate 306 through the first gap spacer 308.

The negative active material is substantially similar to the negative active material of the method 100a/100b and may be lead or any other suitable material, such as may be the active material for a desired electrode. A first manufacturing electrolyte pumping assembly 330 may be used to pump the first manufacturing electrolyte through the first electrode chamber 318 of the electrochemical cell assembly 300. In some embodiments, the first manufacturing electrolyte pumping assembly 330 and the second manufacturing electrolyte pumping assembly 342 are part of a larger pumping assembly configured to pump a plurality of electrolytes. The plurality of electrolytes may include the first manufacturing electrolyte and the second manufacturing electrolyte. The first manufacturing electrolyte may enter the first electrode chamber 318 through the first flow inlet 322 and exit the first electrode chamber 318 through the first flow outlet 324. In such embodiments, the electric signal generator 354 may be electrically coupled to and may apply an AC, DC, or an arbitrary waveform signal in the form of potential or current control to the negative electrode substrate 306. The electric signal generator 354 is configured to control the deposition of the negative active material on the negative electrode substrate 306.

The first manufacturing electrolyte may contain lead ions in a range of solubility from about 0.01 mM to 1 M, inclusive (e.g., 0.01, 0.05, 0.1, 0.5, 1, 10, 20, 50, 100, 200, 500 or 1000 mM, inclusive). The first manufacturing electrolyte may be comprised by water-based mixtures in a range from about 0.01 vol % to about 99.999 vol % water, inclusive (e.g., 0.01, 1, 5, 10, 50, 75, 99, or 99.99 vol %, inclusive) that may contain sulfuric acid, nitric acid, methane sulfonic acid, any other suitable material, or combinations thereof in a concentration range from about 0.01 vol % to about 99.999 vol %, inclusive (e.g., 0.01, 5, 10, 50, 75, 99, or 99.999 vol %, inclusive). The concentration of the first manufacturing electrolyte may be selected for a non-equilibrium steady state that is maintained by the replenishment of the first manufacturing electrolyte from the first manufacturing electrolyte reservoir 332. In some embodiments, the concentration of the first manufacturing electrolyte may be maintained constantly at a steady state concentration while the first manufacturing electrolyte is pumped. In such embodiments, the steady state concentration is driven by changing parameters of the first manufacturing electrolyte, such as stoichiometry. In some embodiments, the electrochemical cell includes a first sensing or sensor device configured to monitor the steady state concentration of the first manufacturing electrolyte. The first sensing or sensor device may be an acoustic sensor, a sensor to detect chemical drift, a sensor to detect electrical drift, or any other suitable sensor.

The first manufacturing electrolyte may be flowed through the electrochemical cell assembly 300 at a first manufacturing flow rate in a range between 0.001 to 100 liters/minute/cm² (e.g., 0.001 liters/minute/cm², 0.01 liters/minute/cm², 0.1 liters/minute/cm², 1 liters/minute/cm², 10 liters/minute/cm², 50 liters/minute/cm², or 100 liters/minute/cm², inclusive).

The electrochemical cell assembly 300 may further include a second manufacturing electrolyte stored in a second manufacturing electrolyte reservoir 344. For embodiments with a plurality of manufacturing electrolytes, a corresponding plurality of manufacturing electrolyte reservoirs 344 may be provided. The second manufacturing electrolyte may have the same concentration and/or composition or a different concentration and/or composition from the first manufacturing composition. The second manufacturing electrolyte may be as described with respect to the method 100a/100b and the manufacturing electrolyte. The second manufacturing electrolyte may be pumped around and/or through the second electrode chamber 320 in the housing 302 such that the second manufacturing electrolyte flows around and/or through the positive electrode substrate 312 in order to electrochemically fabricate a positive active material on the positive electrode substrate 312, thereby forming a positive electrode. In some embodiments, positive active material may include lead dioxide, lead sulfate, lead monoxide, lead hydroxide, combinations thereof, or any other suitable material. In some embodiments, the positive electrode substrate 312 is porous and, the second manufacturing electrolyte is flowed through pores of the positive electrode substrate 312 and may also be flowed around the positive electrode substrate 312. In such embodiments, the second manufacturing electrolyte may be flowed up through, down through, or across through the positive electrode substrate 312. In some embodiments, the positive electrode substrate 312 is impermeable, and the second manufacturing electrolyte may be flowed around the positive electrode substrate 312 or a face of the positive electrode substrate 312 through the second gap spacer 314.

In some embodiments, the second manufacturing electrolyte may be pumped through both the first electrode chamber 318 and the second electrode chamber 320 in the housing 302 around the positive electrode substrate 312 in order to electrochemically fabricate a positive active material on the positive electrode substrate 312, thereby forming a positive electrode, and to electrochemically fabricate a negative active material on the negative electrode substrate 306, thereby forming a negative electrode. In some embodiments, the positive active material on the positive electrode substrate 312 may be different from the negative active material on the negative electrode substrate 306.

In some embodiments, the second manufacturing electrolyte may be pumped through the second electrode chamber 320 in the housing 302 around the positive electrode substrate 312 in order to electrochemically fabricate a positive active material on the positive electrode substrate 312, thereby forming a positive electrode. In some embodiments, the negative active material may include metallic lead, lead sulfate, lead oxide, lead carbonate, combinations thereof, or any other suitable material.

In some embodiments, the positive active material and the negative active material is substantially similar to the active material of method 100 and may be PbO$_2$, Pb, or any other suitable material. FIG. 3 illustrates an embodiment having six manufacturing electrolyte pumping assemblies with an associated electrolyte reservoir. A second manufacturing electrolyte pumping assembly 342 may be used to pump the second manufacturing electrolyte through the second electrode chamber 320 of the electrochemical cell assembly 300.

The second manufacturing electrolyte may enter the second electrode chamber 320 through the second flow inlet 326 and exit the second electrode chamber 320 through the second flow outlet 328.

In some embodiments, the second manufacturing electrolyte may flow through the first electrode chamber 318 and the second electrode chamber 320 such that the second charge electrolyte flows around and/or through both the positive electrode substrate 312 and the negative electrode substrate 306. In some embodiments, the second manufacturing electrolyte may enter the housing 302 through the first flow inlet 322 and exit the housing through the second flow outlet 328. In other embodiments, the second manufacturing electrolyte may enter the housing 302 through the second flow inlet 326 and exit the housing 302 through the first flow outlet 324.

In some embodiments, the second manufacturing electrolyte may flow through the second electrode chamber 320 such that the second manufacturing electrolyte flows around and/or through the positive electrode substrate 312. In such embodiments, the second manufacturing electrolyte may enter the second electrode chamber 320 through the second flow inlet 326 and exit the second electrode chamber 320 through the second flow outlet 328.

The second manufacturing electrolyte may contain lead ions in a range of solubility from about 0.01 mM to 1 M, inclusive (e.g., 0.01, 0.05, 0.1, 0.5, 1, 10, 20, 50, or 100 mM, inclusive). The second manufacturing electrolyte may include water-based mixtures in a range from about 0.01 vol % to about 99.999 vol % water, inclusive (e.g., 0.01, 1, 5, 10, 50, 75, 99, or 99.999 vol %, inclusive) that may contain sulfuric acid, nitric acid, methane sulfonic acid, any other suitable material, or combinations thereof in a concentration range from about 0.01 vol % to about 99.999 vol %, inclusive (e.g., 0.01, 5, 10, 50, 75, 99, or 99.999 vol %, inclusive). The second manufacturing electrolyte may be flowed through the electrochemical cell assembly 300 at a second manufacturing flow rate in a range between 0.001 to 100 liters/minute/cm$^2$ (e.g., 0.001 liters/minute/cm$^2$, 0.01 liters/minute/cm$^2$, 0.1 liters/minute/cm$^2$, 1 liters/minute/cm$^2$, 10 liters/minute/cm$^2$, 50 liters/minute/cm$^2$, or 100 liters/minute/cm$^2$, inclusive). The second manufacturing flow rate may be faster than the first manufacturing flow rate due to better adhesion of the negative active material than the positive active material or a larger surface area of the positive active material.

A second manufacturing electrolyte pumping assembly 342 may be used to pump the second manufacturing electrolyte through the second electrode chamber 320 of the electrochemical cell assembly 300.

Charge Operation

The electrochemical cell assembly 300 further includes include a first charge operation electrolyte stored in a first charge operation electrolyte reservoir 336. The first charge operation electrolyte is may be as described with respect to the method 100a/100b and the operation first electrolyte. The first charge operation electrolyte may be pumped through the first electrode chamber 318 such that the first charge operation electrolyte flows around and/or through the negative electrode formed from the negative electrode substrate 306. In some embodiments, the negative electrode substrate 306 is porous and the first charge operation electrolyte is flowed through pores of the negative electrode substrate 306 and may also be flowed around the negative electrode substrate 306. In such embodiments, the first charge operation electrolyte may be flowed up through, down through, or across through the negative electrode substrate 306. In some embodiments, the negative electrode substrate 306 is impermeable, and the first charge operation electrolyte may be flowed around the negative electrode substrate 306 or a face of the negative electrode substrate 306 through the first gap spacer 308.

A first charge operation electrolyte pumping assembly 334 may be used to pump the first charge operation electrolyte through the first electrode chamber 318 of the electrochemical cell assembly 300. The first charge operation electrolyte may enter the first electrode chamber 318 through the first flow inlet 322 and exit the first electrode chamber 318 through the first flow outlet 324. The first charge operation electrolyte may comprise sulfuric acid having a first charge operation concentration, and is pumped at a first charge operation flow rate. The first charge operation electrolyte may be flowed during a charge process of a cell cycle of the electrochemical cell.

In some embodiments, the first charge operation electrolyte may flow through the first electrode chamber 318 and the second electrode chamber 320 such that the first charge operation electrolyte flows around and/or through both the negative electrode substrate 306 and the positive electrode substrate 312. In some embodiments, the first charge operation electrolyte may enter the housing 302 through the first flow inlet 322 and exit the housing through the second flow outlet 328. In other embodiments, the first charge operation electrolyte may enter the housing 302 through the second flow inlet 326 and exit the housing 302 through the first flow outlet 324.

The first charge operation electrolyte may comprise sulfuric acid or any other suitable electrolyte having an acidic pH (e.g., a pH of <3). In some embodiments, the first charge operation electrolyte may include a plurality of first charge operation additives (e.g., sodium sulfate, organic materials, etc.) and/or dopants (e.g., metals, other insoluble sulfate crystals, etc.). The first charge operation additives may be different from or the same as the first charge operation additives. The first charge operation electrolyte has a first charge concentration with a first charge flow rate. The first charge operation concentration may be in a range in between about 0.05 to about 10 M (e.g., 0.05 M, 0.1 M, 0.5 M, 1 M, 2 M, 4 M, 6 M, 8 M, or 10 M, inclusive). In some embodiments, the overall reaction at the negative active material may be depicted by Equation 1.

$$PbSO_{4(s)} + 2e^- \leftrightarrow Pb_{(s)} + SO_4^{2-}{}_{(aq)} \qquad [1]$$

The first charge operation concentration may be selected for a non-equilibrium steady state that is maintained by the replenishment of the first charge operation electrolyte from the first charge operation electrolyte reservoir 336. In some embodiments, the first charge operation electrolyte may be maintained constantly and homogeneous at a pre-defined non-equilibrium steady state concentration within the electrodes. In such embodiments, the steady state concentration is driven by changing parameters of the first charge operation electrolyte, such as stoichiometry. In some embodiments, the electrochemical cell includes a third electrode, such as a sensing electrode or electrode configured to monitor the steady state concentration of the first charge electrolyte. The third electrode may be an acoustic sensor, a sensor to detect chemical drift, a sensor to detect electrical drift, or any other suitable sensor.

The first charge operation flow rate may be in a range in between about 0.001 to 100 liters/minute/cm² (e.g., 0.001 liters/minute/cm², 0.01 liters/minute/cm², 0.1 liters/minute/cm², 1 liters/minute/cm², 10 liters/minute/cm², 50 liters/minute/cm², or 100 liters/minute/cm², inclusive).

In such embodiments, the first charge operation electrolyte is optimized for the charge process and configured to improve reduction at the negative electrode by, for example, increasing the availability of electrons to react with the lead ions in solution and solubility of lead ions in solution to increase the kinetics of the lead sulfate dissolution. The first charge operation electrolyte may be continuously pumped into the electrochemical cell assembly 300 at the first charge operation flow rate so as to help purge trapped bubbles in the active material or separator and reduce or eliminate local concentration gradients driven by gravity or slow diffusion through pores that generally occurs with a stationary non-flowing electrolyte.

The electrochemical cell assembly 300 may further include a second charge operation electrolyte stored in a second charge operation electrolyte reservoir 348. The second charge operation electrolyte may be as described with respect to method 100 and the operation second electrolyte. The second charge operation electrolyte may be pumped through the second electrode chamber 320 such that the second charge operation electrolyte flows around and/or through the positive electrode formed from the positive electrode substrate 312. In some embodiments, the positive electrode substrate 312 may be porous and the second charge operation electrolyte may be flowed through pores of the positive electrode substrate 312 and may also be flowed around the positive electrode substrate 312. In such embodiments, the second charge operation electrolyte may be flowed up through, down through, or across through the positive electrode substrate 312. In some embodiments, the positive electrode substrate 312 is impermeable, and the second charge operation electrolyte may be flowed around the positive electrode substrate 312 or a face of the positive electrode substrate 312 through the second gap spacer 314.

A second charge operation electrolyte pumping assembly 346 may be used to pump the second charge operation electrolyte through the second electrode chamber 320 of the electrochemical cell assembly 300. The second charge operation electrolyte may enter the second electrode chamber 320 through the second flow inlet 326 and exit the second electrode chamber 320 through the second flow outlet 328. The second charge operation electrolyte may comprise water-based mixtures in a range from about 0.01 vol % to about 99.999 vol % water, inclusive (e.g., 0.01, 1, 5, 10, 50, 75, 99, or 99.99 vol %, inclusive) that may contain sulfuric acid, nitric acid, methane sulfonic acid, any other suitable material, or combinations thereof in a concentration range from about 0.01 vol % to about 99.999 vol %, inclusive (e.g., 0.01, 5, 10, 50, 75, 99, or 99.999 vol %, inclusive). The second charge operation electrolyte has a second charge operation concentration, and is pumped at a second charge operation flow rate. The second charge operation electrolyte may be flowed during a charge process of a cell cycle of the electrochemical cell assembly 300.

In some embodiments, the second charge operation electrolyte may flow through the first electrode chamber 318 and the second electrode chamber 320 such that the second charge operation electrolyte flows around and/or through both the positive electrode substrate 312 and the negative electrode substrate 306. In some embodiments, the second charge operation electrolyte may enter the housing 302 through the first flow inlet 322 and exit the housing through the second flow outlet 328. In some embodiments, the second charge operation electrolyte may flow through the second electrode chamber 320 such that the second charge operation electrolyte flows around and/or through the negative electrode substrate 306. In such embodiments, the second charge operation electrolyte may enter the second electrode chamber 320 through the second flow inlet 326 and exit the second electrode chamber 320 through the second flow outlet 328.

The second charge operation electrolyte may comprise sulfuric acid or any other suitable electrolyte having an acidic pH (e.g., a pH of <3). In some embodiments, the second charge operation electrolyte may include a plurality of second charge operation additives (e.g., sodium sulfate, organic materials, etc.) and/or dopants (e.g., metals, other insoluble sulfate crystals, etc.). The second charge operation concentration may be in a range in between about 0.05 M to about 10 M (e.g., 0.05 M, 0.1 M, 0.5 M, 1 M, 2 M, 4 M, 6

M, 8 M, or 10 M, inclusive). In some embodiments, the overall reaction at the positive electrode may be depicted by Equation 2.

$$PbSO_{4(s)}+2H_2O_{(l)} \leftrightarrow PbO_{2(s)}+4H^+_{(aq)}+2e^-+SO_4^{2-}_{(aq)} \qquad [2]$$

The second charge operation concentration may be selected for a non-equilibrium steady state that is maintained by the replenishment of the second charge operation electrolyte from the second charge operation electrolyte reservoir 348. In some embodiments, the second charge operation concentration may be maintained constantly and homogeneous at a pre-defined concentration while the second charge operation electrolyte is pumped. In such embodiments, the steady state concentration is driven by changing parameters of the second charge operation electrolyte, such as stoichiometry.

In some embodiments, the second charge operation electrolyte is optimized for the charge process and designed to improve oxidation at the positive electrode by, for example, increasing the rates of electron transfer to the positive active material or improving the overall kinetics of the reaction of the protons produced from a reaction with the lead sulfate and water by improving mass transport. The second charge operation electrolyte may be continuously pumped into the cell at the second charge operation flow rate and can reduce or eliminate local concentration gradients. The second charge operation flow rate may be in a range between about 0.001 to 100 liters/minute/cm² (e.g., 0.001 liters/minute/cm², 0.01 liters/minute/cm², 0.1 liters/minute/cm², 1 liters/minute/cm², 10 liters/minute/cm², 50 liters/minute/cm², or 100 liters/minute/cm², inclusive).

In some embodiments, the second charge operation concentration may be different from the first charge operation concentration. The second charge operation flow rate may be different or equal to the first charge operation flow rate. In some embodiments, the second charge operation flow rate may be greater than the first charge operation flow rate. In such embodiments, the second charge operation flow rate may be faster due to poorer adhesion of the positive active material in comparison to the negative active material. The second charge operation flow rate may also be greater due to a higher surface area of the positive active material in comparison to the negative active.

Discharge Operation

The electrochemical cell assembly 300 may further include a first discharge operation electrolyte stored in a first discharge operation electrolyte reservoir 340. The first discharge operation electrolyte may be pumped during the discharge process of the cell cycle of the electrochemical cell assembly 300. The first discharge operation electrolyte may be pumped through the first electrode chamber 318 such that the first discharge operation electrolyte flows around and/or through the negative electrode formed from the negative electrode substrate 306. In some embodiments, the negative electrode substrate 306 is porous and the first discharge operation electrolyte is flowed through pores of the negative electrode substrate 306 and may also be flowed around the negative electrode substrate 306. In such embodiments, the first discharge operation electrolyte may be flowed up through, down through, or across through the negative electrode substrate 306. In some embodiments, the negative electrode substrate 306 is impermeable, and the first discharge operation electrolyte may be flowed around the positive electrode substrate 312 or a face of the positive electrode substrate 312 through the first gap spacer 308.

A first discharge operation electrolyte pumping assembly 338 may be used to pump the first discharge operation electrolyte through the first electrode chamber 318 of the electrochemical cell assembly 300. In some embodiments, the first charge operation electrolyte pumping assembly 334, the first discharge operation electrolyte pumping assembly 338, the second charge operation electrolyte pumping assembly 346, and the second discharge operation electrolyte pumping assembly 350 are part of the larger pumping assembly configured to pump a plurality of electrolytes. The plurality of electrolytes may include the first charge operation electrolyte, the first discharge operation electrolyte, the second charge operation electrolyte, and the second discharge operation electrolyte.

The first discharge operation electrolyte may have a first discharge operation concentration may be in a range in between about 0.05 M to about 10 M (e.g., 0.05 M, 0.1 M, 0.5 M, 1 M, 2 M, 4 M, 6 M, 8 M, or 10 M, inclusive). The first discharge operation concentration may be different than the first charge operation concentration and/or second charge operation concentration in order to optimize the first discharge operation electrolyte for the discharge process of the cycle as compared to the charge process. The concentration of the first discharge operation electrolyte may be selected for a non-equilibrium steady state that is maintained by the replenishment of the first operation discharge electrolyte from the first discharge operation electrolyte reservoir 340. In some embodiments, the first discharge operation concentration may be maintained constantly at a steady state concentration while the first discharge operation electrolyte is pumped. In such embodiments, the steady state concentration is driven by changing parameters of the first discharge electrolyte, such as stoichiometry.

In such embodiments, the first discharge operation electrolyte is optimized for the discharge process and configured to improve reduction at the positive active material by, for example, increasing the availability of protons to react with the lead dioxide or improving the kinetics of the reaction of the lead ions produced from a reaction with lead ions and sulfate. The first discharge operation electrolyte may be continuously pumped into the cell at a first discharge operation flow rate and can reduce or eliminate local concentration gradients. The first discharge operation flow rate may be in a range in between about 0.001 to 100 liters/minute/cm² (e.g., 0.001 liters/minute/cm², 0.01 liters/minute/cm², 0.1 liters/minute/cm², 1 liters/minute/cm², 10 liters/minute/cm², 50 liters/minute/cm², or 100 liters/minute/cm², inclusive). The first discharge operation flow rate may be different or equal to the first discharge operation flow rate, first charge operation flow rate, or first charge operation flow rate. The second discharge operation flow rate may be slower than the first discharge operation flow rate due to poorer adhesion of the negative active material in comparison to the positive active material or due to the larger surface area of the positive active material.

In some embodiments, the first charge operation electrolyte and/or second charge operation electrolyte is removed from the electrochemical cell assembly 300 prior to the flow of the first discharge operation electrolyte. In some embodiments, the first discharge operation electrolyte is pumped into the cell as the first charge operation electrolyte or first charge operation electrolyte is sequentially pumped out of the cell. In some embodiments, the first discharge operation electrolyte is pumped into the cell concurrently with the first discharge operation electrolyte. In other embodiments, the first discharge operation electrolyte is not pumped into the cell while the first discharge operation electrolyte is pumped into the cell.

The first discharge operation electrolyte may comprise water-based mixtures in a range from about 0.01 vol % to about 99.999 vol % water, inclusive (e.g., 0.01, 1, 5, 10, 50, 75, 99, or 99.99 vol %, inclusive) that may contain sulfuric acid, nitric acid, methane sulfonic acid, any other suitable material, or combinations thereof in a concentration range from about 0.01 vol % to about 99.999 vol %, inclusive (e.g., 0.01, 5, 10, 50, 75, 99, or 99.999 vol %, inclusive). The first discharge operation electrolyte has an acidic pH (e.g., a pH of <3). In some embodiments, the first discharge operation electrolyte may include a plurality of first discharge operation additives (e.g., sodium sulfate, organic materials, etc.) and/or dopants (e.g., metals, other insoluble sulfate crystals, etc.). The first discharge operation additives may be the same as or different from the first discharge operation additives, the first charge operation additives and/or the first charge operation additives. In some embodiments, the first discharge operation electrolyte may be flowed during the discharge process of the cell cycle. The first discharge operation electrolyte may be flowed around and/or through the negative active material within the first electrode chamber 318.

It is understood that the number of electrolytes pumped through the electrochemical cell assembly 300 around the positive electrode formed from the positive electrode substrate 312 or the negative electrode formed from the negative electrode substrate 306 is not limited to two during the charge process or the discharge process of the cell cycle. It is understood that a plurality of electrolytes in the electrochemical cell assembly 300 may each comprise sulfuric acid having a different composition or concentration.

With continued reference to FIG. 3, the electrochemical cell assembly 300 may further include a second discharge operation electrolyte stored in a second discharge operation electrolyte reservoir 352. The second discharge operation electrolyte may be pumped during the discharge process of the cell cycle of the electrochemical cell assembly 300. The second discharge operation electrolyte may be pumped through the second electrode chamber 320 such that the second discharge operation electrolyte flows around and/or through the positive electrode formed from the positive electrode substrate 312. In some embodiments, the positive electrode substrate 312 is porous and the second discharge operation electrolyte is flowed through pores of the positive electrode substrate 312 and may also be flowed around the positive electrode substrate 312. In such embodiments, the second discharge operation electrolyte may be flowed up through, down through, or across through the positive electrode substrate 312. In some embodiments, the positive electrode substrate 312 is impermeable, and the second discharge operation electrolyte may be flowed around the positive electrode substrate 312 or a face of the positive electrode substrate 312 through the second gap spacer 314.

A second discharge operation electrolyte pumping assembly 350 may be used to pump the second discharge operation electrolyte through the second electrode chamber 320 of the electrochemical cell assembly 300.

The second discharge operation electrolyte may enter the second electrode chamber 320 through the second flow inlet 326 and exit the second electrode chamber 320 through the second flow outlet 328. The second discharge operation electrolyte may comprise sulfuric acid having a second discharge operation concentration and may be pumped through the second electrode chamber 320 at a first discharge operation flow rate.

In some embodiments, the second charge operation electrolyte may be drained before the second discharge operation electrolyte is pumped through second electrode chamber 320. In some embodiments, the second discharge operation electrolyte may be sequentially pumped through the second electrode chamber 320 as the second charge operation electrolyte exits the second electrode chamber 320. The first discharge operation electrolyte may enter the first electrode chamber 318 through the first flow inlet 322 and exit the first electrode chamber 318 through the first flow outlet 324. The first discharge operation electrolyte and the first discharge operation electrolyte may be resident in the cell simultaneously, with the first discharge operation electrolyte pumped into the first electrode chamber 318 and the second discharge operation electrolyte pumped into the second electrode chamber 320. Alternatively, the first discharge operation electrolyte may be in fluid communication with both the first electrode chamber 318 and the second electrode chamber 320 and then evacuated as the second discharge operation electrolyte is pumped, the second discharge operation electrolyte also being in fluid communication with both active materials, providing a sequential series of electrolytes.

In some embodiments, the second discharge operation electrolyte may flow through the first electrode chamber 318 and the second electrode chamber 320 such that the second discharge operation electrolyte flows around and/or through both the positive electrode substrate 312 and the negative electrode substrate 306. In some embodiments, the second discharge operation electrolyte may enter the housing 302 through the second flow inlet 326 and exit the housing through the second flow outlet 328. In other embodiments, the second discharge operation electrolyte may enter the housing 302 through the second flow inlet 326 and exit the housing 302 through the second flow outlet 328.

In some embodiments, the second discharge operation electrolyte may flow through the second electrode chamber 320 such that the second discharge operation electrolyte flows around and/or through the negative electrode substrate 306. In such embodiments, the second discharge operation electrolyte may enter the second electrode chamber 320 through the second flow inlet 326 and exit the second electrode chamber 320 through the second flow outlet 328.

The second discharge operation electrolyte may have a second discharge operation concentration in a range between about 0.05 M to 10 M (e.g., 0.05 M, 0.1 M, 0.5 M, 1 M, 2 M, 4 M, 6 M, 8 M, or 10 M, inclusive). The second discharge operation concentration may be different than the second charge operation concentration and/or second charge operation concentration, in order to optimize the second discharge operation electrolyte for the discharge process of the cycle. The second discharge operation electrolyte may be pumped into the electrochemical cell from the second discharge operation electrolyte reservoir 352 and flowed over or through the positive electrode substrate 312. The second discharge operation concentration may be selected for a non-equilibrium steady state that is maintained by the replenishment of the second discharge operation electrolyte from the second discharge operation electrolyte reservoir 352. In some embodiments, the second discharge operation concentration may be maintained constantly homogeneous at a pre-defined concentration while the second discharge operation electrolyte is pumped. In such embodiments, the steady state concentration is driven by changing parameters of the second discharge operation electrolyte, such as stoichiometry. In some embodiments, the electrochemical cell assembly 300 includes a sixth electrode or sensor configured to monitor the steady state concentration of the second discharge operation electrolyte. The sixth electrode or sensor may be an acoustic sensor, a sensor to detect chemical drift, a sensor to detect electrical drift, or any other suitable sensor.

In such embodiments, the second discharge operation electrolyte is optimized for the discharge process and configured to improve oxidation process efficiencies at the negative active material by, for example, increasing the availability of electrons to migrate to the negative active material or improving the kinetics of the reaction of the electrons produced from a reaction with the lead and sulfate ions. It is understood that the number of operation electrolytes pumped through the second electrode chamber 320 around the positive electrode formed from the positive electrode substrate 312 in the discharge process is not limited to two during the charge process or the discharge process of the cell cycle. When the second charge operation electrolyte or the second discharge operation electrolyte are flowed over and/or through the positive electrode substrate 312 in the discharge process, the reaction at the positive electrode substrate 312 may be from lead sulfate solid to metallic lead.

The second discharge operation electrolyte may be continuously pumped into the cell at a second discharge operation flow rate and can reduce or eliminate local concentration gradients. The second discharge operation flow rate may be in a range between about 0.001 to 100 liters/minute/cm$^2$ (e.g., 0.001 liters/minute/cm$^2$, 0.01 liters/minute/cm$^2$, 0.1 liters/minute/cm$^2$, 1 liters/minute/cm$^2$, 10 liters/minute/cm$^2$, 50 liters/minute/cm$^2$, or 100 liters/minute/cm$^2$, inclusive). The second discharge operation concentration is different from the second charge operation concentration. The second discharge operation concentration may be different than or equal to the second charge operation concentration. The second discharge operation flow rate may be different or equal to the second charge operation flow rate.

In some embodiments, the second discharge operation electrolyte is pumped into the cell as the second charge operation electrolyte or second charge operation electrolyte is sequentially pumped out of the cell. The second discharge operation electrolyte may comprise water-based mixtures in a range from about 0.01 vol % to about 99.999 vol % water, inclusive (e.g., 0.01, 1, 5, 10, 50, 75, 99, or 99.99 vol %, inclusive) that may contain sulfuric acid, nitric acid, methane sulfonic acid, any other suitable material, or combinations thereof in a concentration range from about 0.01 vol % to about 99.999 vol %, inclusive (e.g., 0.01, 5, 10, 50, 75, 99, or 99.999 vol %, inclusive). The second discharge operation electrolyte has an acidic pH (e.g., a pH of <3). In some embodiments, the second discharge operation electrolyte may include a plurality of second discharge operation additives (e.g., sodium sulfate, organic materials, etc.) and/or dopants (e.g., metals, other insoluble sulfate crystals, etc.). The second discharge operation additives may be the same as or different from the second charge operation additives and/or the second charge operation additives. In some embodiments, the second discharge electrolyte may be flowed during a discharge process of the cell cycle. The second discharge operation electrolyte may be flowed around and/or through the positive active material (the positive electrode substrate 312) within the second electrode chamber 320.

Open Circuit

With continued reference to FIG. 3, the electrochemical cell assembly 300 is an open circuit process in which there is no active exchange of electrons through an external circuit. In such embodiments, the electrochemical cell assembly 300 includes a positive electrode substrate 312 and a negative electrode substrate 306, which will be referred to as such for description of these embodiments, although it will be appreciated that the respective materials may not be participating in an electrochemical reaction as an active materials. The positive electrode substrate 312 is in the second electrode chamber 320, and the negative electrode substrate 306 is in the first electrode chamber 318. In some embodiments, the electrochemical cell assembly 300 may be configured such that one or more electrolytes that are optimized for conditioning the positive electrode substrate 312 and/or negative electrode substrate 306 to prevent degradation of the positive electrode substrate 312 and/or negative electrode substrate 306 are pumped through the electrochemical cell assembly 300 during a long term storage phase of the electrochemical cell assembly 300. In some embodiments, electrochemical cell assembly 300 may have the electrolytes removed, or substantially removed, such that the electrochemical cell assembly 300 is in a "dry" state.

For example, in some embodiments, the electrochemical cell assembly 300 further includes a first open circuit electrolyte stored in a first open circuit electrolyte reservoir (not shown). The first open circuit electrolyte may be pumped during the open circuit process of the cell cycle of the electrochemical cell. The first open circuit electrolyte may be pumped through the first electrode chamber 318 and flowed around and/or through the negative active material within the first electrode chamber 318. In some embodiments, the negative active material is porous and the first open circuit electrolyte is flowed through pores of the negative active material and may also be flowed around the negative active material. In such embodiments, the first open circuit electrolyte may be flowed up through, down through, or across through the negative active material. In some embodiments, the negative active material is impermeable, and the first open circuit electrolyte may be flowed around the negative active material or a face of the negative active material through the second gap spacer 314.

A first open circuit electrolyte pumping assembly (not shown) may be used to pump the first open circuit electrolyte through the first electrode chamber 318 of the electrochemical cell assembly 300. In some embodiments, the first open circuit electrolyte pumping assembly may be part of the larger pumping assembly. The first open circuit electrolyte may enter the first electrode chamber 318 after a prior electrolyte has been completely drained from the second electrode chamber 320, or sequentially as a prior electrolyte is being pumped out of the first electrode chamber 318. The first open circuit electrolyte may enter the first electrode chamber 318 through the first flow inlet 322 and exit the first electrode chamber 318 through the first flow outlet 324.

In some embodiments, the first open circuit electrolyte may flow through the first electrode chamber 318 and the second electrode chamber 320 such that the first open circuit electrolyte flows around and/or through both the negative active material and the positive active material. In some embodiments, the first open circuit electrolyte may enter the housing 302 through the first flow inlet 322 and exit the housing through the second flow outlet 328. In other embodiments, the first open circuit electrolyte may enter the housing 302 through the second flow inlet 326 and exit the housing 302 through the first flow outlet 324.

The first open circuit may comprise water-based mixtures in a range from about 0.01 vol % to about 99.999 vol % water, inclusive (e.g., 0.01, 1, 5, 10, 50, 75, 99, or 99.99 vol %, inclusive) that may contain sulfuric acid, nitric acid, methane sulfonic acid, any other suitable material, or combinations thereof in a concentration range from about 0.01 vol % to about 99.999 vol %, inclusive (e.g., 0.01, 5, 10, 50, 75, 99, or 99.999 vol %, inclusive). The first open circuit electrolyte has any other suitable electrolyte having an acidic pH (e.g., a pH of <3). In some embodiments, the first open circuit electrolyte may include a plurality of first open circuit additives (e.g., sodium sulfate, organic materials, etc.) and/or dopants (e.g., metals, other insoluble sulfate crystals, etc.). The first open circuit additives may be the same as or different from the first discharge additives, the first charge additives, and/or the second discharge additives. The first open circuit electrolyte has a first open circuit concentration and may be flowed through the first electrode chamber 318 at a first open circuit flow rate. The first open circuit concentration may be in a range between about 0.05 to 10 M (e.g., 0.05 M, 0.1 M, 0.5 M, 1 M, 2 M, 4 M, 6 M, 8 M, or 10 M, inclusive) and different from the first charge concentration, the second charge concentration, the first discharge concentration, and the second discharge concentration. The first open circuit concentration may be selected for a non-equilibrium steady state that is maintained by the replenishment of the first open circuit electrolyte from the first open circuit electrolyte reservoir. In some embodiments, the first open circuit concentration may be maintained constantly at a steady state concentration while the first open circuit electrolyte is pumped. In such embodiments, the steady state concentration is driven by changing parameters of the first open circuit electrolyte, such as stoichiometry.

The first open circuit flow rate may be in a range between about 0.001 to 100 liters/minute/cm² (e.g., 0.001 liters/minute/cm², 0.01 liters/minute/cm², 0.1 liters/minute/cm², 1 liters/minute/cm², 10 liters/minute/cm², 50 liters/minute/cm², or 100 liters/minute/cm², inclusive) and different from or equal to the first charge flow rate, the second charge flow rate, the first discharge flow rate, or the second discharge flow rate. In some embodiments, pumping the first open circuit electrolyte so that it flows around and/or through the negative active material and/or the positive active material during the open circuit process for long term storage may result in stripping off buildup on the negative active material, the negative active material and the positive active material, or the positive active material (e.g., lead oxide, lead sulfate). In some embodiments, the first open circuit electrolyte may be used to strip off buildup on the negative active material and/or positive active material (e.g., lead sulfate, lead oxide, etc.) and may flow during any process of the cell cycle. In some embodiments, the first open circuit electrolyte is optional.

In some embodiments, the electrochemical cell assembly 300 further includes a second open circuit electrolyte stored in a second open circuit electrolyte reservoir (not shown). The second open circuit operation electrolyte may be pumped during the open circuit process of the cell cycle of the electrochemical cell assembly 300. The second open circuit operation electrolyte may be pumped through the second electrode chamber 320 and flowed around and/or through the positive electrode substrate 312 within the second electrode chamber 320. In some embodiments, the positive electrode substrate 312 is porous and the second open circuit operation electrolyte is flowed through pores of the positive electrode substrate 312 and may also be flowed around the positive electrode substrate 312. In such embodiments, the second open circuit operation electrolyte may be flowed up through, down through, or across through the second, positive electrode substrate 312. In some embodiments, the positive electrode substrate 312 is impermeable, and the second open circuit operation electrolyte may be flowed around the positive electrode substrate 312 or a face of the positive electrode substrate 312 through the second gap spacer 314.

A second open circuit operation electrolyte pumping assembly (not shown) may be used to pump the first open circuit operation electrolyte through the second electrode chamber 320 of the electrochemical cell assembly 300. In some embodiments, the second open circuit operation electrolyte pumping assembly may be part of the larger pumping assembly. The second open circuit operation electrolyte may enter the second electrode chamber 320 after a prior electrolyte has been completely drained or sequentially as a prior electrolyte is being pumped out of the second electrode chamber 320. The second open circuit operation electrolyte may enter the second electrode chamber 320 through the second flow inlet 326 and exit the second electrode chamber 320 through the second flow outlet 328.

In some embodiments, the second open circuit operation electrolyte may flow through the first electrode chamber 318 and the second electrode chamber 320 such that the second open circuit operation electrolyte flows around and/or through both the second, positive electrode substrate 312 and the first, negative electrode substrate 306. In some embodiments, the second open circuit operation electrolyte may enter the housing 302 through the first flow inlet 322 and exit the housing through the second flow outlet 328. In other embodiments, the second open circuit operation electrolyte may enter the housing 302 through the second flow inlet 326 and exit the housing 302 through the second flow outlet 328.

In some embodiments, the second open circuit operation electrolyte may flow through the second electrode chamber 320 such that the second open circuit operation electrolyte flows around and/or through the negative active material (the negative electrode substrate 306). In such embodiments, the second open circuit operation electrolyte may enter the second electrode chamber 320 through the second flow inlet 326 and exit the second electrode chamber 320 through the second flow outlet 328.

The second open circuit electrolyte may comprise water-based mixtures in a range from about 0.01 vol % to about 99.999 vol % water, inclusive (e.g., 0.01, 1, 5, 10, 50, 75, 99, or 99.99 vol %, inclusive) that may contain sulfuric acid, nitric acid, methane sulfonic acid, any other suitable material, or combinations thereof in a concentration range from about 0.01 vol % to about 99.999 vol %, inclusive (e.g., 0.01, 5, 10, 50, 75, 99, or 99.999 vol %, inclusive). The second open circuit electrolyte has any other suitable electrolyte having an acidic pH (e.g., a pH of <3). In some embodiments, the second open circuit electrolyte may include a plurality of second open circuit additives (e.g., sodium sulfate) and/or dopants (e.g., metals, organic materials, etc.). The second open circuit electrolyte has a second open circuit concentration and may be flowed through the second electrode chamber 320 at a second open circuit flow rate. The second open circuit concentration may be in a range between about 0.05 to 10 M (e.g., 0.05 M, 0.1 M, 0.5 M, 1 M, 2 M, 4 M, 6 M, 8 M, or 10 M, inclusive) and different from the first charge concentration, the second charge concentration, the first discharge concentration, the second discharge concentration, and the first open circuit concentration. The second open circuit concentration may be selected for a non-equilibrium steady state that is maintained by the replenishment of the second open circuit electrolyte from the second open circuit electrolyte reservoir. In some embodiments, the second open circuit concentration may be maintained constantly at a steady state concentration while the second open circuit electrolyte is pumped. In such embodiments, the steady state concentration is driven by changing parameters of the second open circuit electrolyte, such as stoichiometry.

In some embodiments, the electrochemical cell assembly 300 includes a sensing device configured to monitor the steady state concentration of the second open circuit operation electrolyte. The sensing device may be a third electrode, an acoustic sensor, a sensor to detect chemical drift, a sensor to detect electrical drift, or any other suitable sensor.

The second open circuit flow rate may be in a range between about 0.001 to 100 liters/minute/cm² (e.g., 0.001 liters/minute/cm², 0.01 liters/minute/cm², 0.1 liters/minute/cm², 1 liters/minute/cm², 10 liters/minute/cm², 50 liters/minute/cm², or 100 liters/minute/cm², inclusive) and different from or equal to the first charge flow rate, the second charge flow rate, the first discharge flow rate, the second discharge flow rate, or the first open circuit flow rate. In some embodiments, flowing the second open circuit electrolyte during the open circuit process for long term storage may result in stripping off buildup on the positive active material (e.g., lead sulfate, lead oxide, etc.). In some embodiments, the second open circuit electrolyte may be used to strip off buildup on the positive active material and may flow during any process of the cell cycle. In some embodiments, the second open circuit electrolyte is optional.

Regeneration/Conditioning Operation

The electrochemical cell assembly 300 may further include a first regeneration operation electrolyte stored in a first regeneration electrolyte reservoir (not shown). The first regeneration electrolyte may be pumped during the regeneration process of the cell cycle of the electrochemical cell assembly 300. The first regeneration electrolyte may be pumped through the first electrode chamber 318 such that the first regeneration electrolyte flows around and/or through the negative electrode formed from the negative electrode substrate 306. In some embodiments, the negative electrode substrate 306 is porous and the first regeneration electrolyte is flowed through pores of the negative electrode substrate 306 and may also be flowed around the negative electrode substrate 306. In such embodiments, the first discharge operation electrolyte may be flowed up through, down through, or across through the negative electrode substrate 306. In some embodiments, the negative electrode substrate 306 is impermeable, and the first discharge operation electrolyte may be flowed around the positive electrode substrate 312 or a face of the positive electrode substrate 312 through the first gap spacer 308.

In one embodiment, a first regeneration electrolyte pumping assembly (not shown) may be used to pump the first regeneration electrolyte through the first electrode chamber 318 of the electrochemical cell assembly 300. In some embodiments, the first regeneration electrolyte pumping assembly may be part of the larger pumping assembly. The first regeneration electrolyte may enter the first electrode chamber 318 through the first flow inlet 322 and exit the second electrode chamber 320 through the second flow outlet 328. The first regeneration electrolyte may enter the housing 302 after a prior electrolyte has been completely drained from the first electrode chamber 318 or sequentially as the prior electrolyte is being pumped out of the first electrode chamber 318. Alternatively, the first regeneration electrolyte and the second regeneration electrolyte may be resident in the cell simultaneously, with the first regeneration electrolyte pumped into the first electrode chamber 318 and the second regeneration electrolyte pumped into the second electrode chamber 320.

The first regeneration electrolyte may include water-based mixtures in a range from about 0.01 vol % to about 99.999 vol % water, inclusive (e.g., 0.01, 1, 5, 10, 50, 75, 99, 99.9, 99.99 or 99.999 vol %, inclusive) that may contain sulfuric acid, nitric acid, methane sulfonic acid, alkaline solutions, any other suitable material, or combinations thereof in a concentration range from about 0.01 vol % to about 99.999 vol %, inclusive (e.g., 0.01, 5, 10, 50, 75, 99, or 99.999 vol %, inclusive). The first regeneration electrolyte may have a concentration and/or composition the same as or different from the second regeneration electrolyte. The first regeneration electrolyte may be flowed through the electrochemical cell assembly 300 at a first regeneration flow rate in a range between 0.001 to 100 liters/minute/cm² (e.g., 0.001 liters/minute/cm², 0.01 liters/minute/cm², 0.1 liters/minute/cm², 1 liters/minute/cm², 10 liters/minute/cm², 50 liters/minute/cm², or 100 liters/minute/cm², inclusive). The first regeneration flow rate may be the same as or different from the first regeneration flow rate.

In some embodiments, the first electrical signal from the electric signal generator 354 may be reapplied to the negative electrode substrate 306 after the removal of the negative active material. In such embodiments, the first manufacturing electrolyte may be flowed again around the negative electrode substrate 306 so as to redeposit (or refabricate) the negative active material on the negative electrode substrate 306. In some embodiments, the first manufacturing electrolyte may be flowed again around both the positive electrode substrate 312 and the negative electrode substrate 306 so as to redeposit the active material on both the positive electrode substrate 312 and the negative electrode substrate 306. In some embodiments, the first electrical signal from the electric signal generator 354 may be reapplied to the negative electrode substrate 306 after the removal of the negative active material. In such embodiments, the first manufacturing electrolyte may be flowed again around the negative electrode substrate 306 so as to redeposit the active material on the negative electrode substrate 306.

With continued reference to FIG. 3, the electrochemical cell assembly 300 includes a second regeneration electrolyte stored in a second regeneration electrolyte reservoir (not shown). In such embodiments, the electrochemical cell assembly 300 includes a positive electrode substrate 312 and a negative electrode substrate 306, which will be referred to as such for description of these embodiments although it will be appreciated that the respective materials may not be participating in an electrochemical reaction as an active materials. The second regeneration electrolyte may be flowed through the second electrode chamber 320 around and/or through the positive electrode formed from the positive electrode substrate 312 in order to remove the spent active material from the second electrode. In some embodiments, the second, positive electrode substrate 312 is porous and the second regeneration electrolyte is flowed through pores of the second, positive electrode substrate 312 and may also be flowed around the second, positive electrode substrate 312. In such embodiments, the second regeneration electrolyte may be flowed up through, down through, or across through the second, positive electrode substrate 312. In some embodiments, the second, positive electrode substrate 312 is impermeable, and the second regeneration electrolyte may be flowed around the second, positive electrode substrate 312 or a face of the second, positive electrode substrate 312 through the second gap spacer 314.

A second regeneration electrolyte pumping assembly (not shown) may be used to pump the second regeneration electrolyte through the second electrode chamber 320 of the electrochemical cell assembly 300. In some embodiments, the second regeneration electrolyte pumping assembly may be part of the larger pumping assembly. The second regeneration electrolyte may enter the second electrode chamber 320 through the second flow inlet 326 and exit the second electrode chamber 320 through the second flow outlet 328.

In some embodiments, the second regeneration electrolyte may flow through the first electrode chamber 318 and the second electrode chamber 320 such that the second regeneration electrolyte flows around and/or through both the positive electrode substrate 312 and the negative electrode substrate 306. In some embodiments, the second regeneration electrolyte may enter the housing 302 through the second flow inlet 326 and exit the housing through the second flow outlet 328. In other embodiments, the second regeneration electrolyte may enter the housing 302 through the second flow inlet 326 and exit the housing 302 through the second flow outlet 328.

In some embodiments, the second regeneration electrolyte may flow through the second electrode chamber 320 such that the second regeneration electrolyte flows around and/or through the negative electrode substrate 306. In such embodiments, the second regeneration electrolyte may enter the second electrode chamber 320 through the second flow inlet 326 and exit the second electrode chamber 320 through the second flow outlet 328.

When the second regeneration electrolyte is flowed through the housing 302, the electric signal generator 354 may be configured to apply a second electrical signal to the positive electrode substrate 312 to remove the spent active material from the positive electrode substrate 312 or to the negative electrode substrate 306 to remove the spent active material from the negative electrode substrate 306.

The second regeneration electrolyte may include water-based mixtures in a range from about 0.01 vol % to about 99.999 vol % water, inclusive (e.g., 0.01, 1, 5, 10, 50, 75, 99, 99.9, 99.99 or 99.999 vol %, inclusive) that may contain sulfuric acid, nitric acid, methane sulfonic acid, alkaline solutions, any other suitable material, or combinations thereof in a concentration range from about 0.01 vol % to about 99.999 vol %, inclusive (e.g., 0.01, 5, 10, 50, 75, 99, or 99.999 vol %, inclusive). The second regeneration electrolyte may be pumped through the electrochemical cell assembly 300 at a second regeneration flow rate in a range between 0.001 to 100 liters/minute/cm$^2$ (e.g., 0.001 liters/minute/cm$^2$, 0.01 liters/minute/cm$^2$, 0.1 liters/minute/cm$^2$, 1 liters/minute/cm$^2$, 10 liters/minute/cm$^2$, 50 liters/minute/cm$^2$, or 100 liters/minute/cm$^2$, inclusive).

In some embodiments, the electrochemical cell assembly 300 includes a sensing electrode or other types of sensors or a plurality of sensing electrodes configured to monitor the electrolyte concentration of the first manufacturing electrolyte, the second manufacturing electrolyte, the first charge operation electrolyte, the second charge operation electrolyte, the first discharge operation electrolyte, the second discharge operation electrolyte, the first open circuit operation electrolyte, the second open circuit operation electrolyte, the first regeneration electrolyte, the second regeneration electrolyte, any other electrolyte in the electrochemical cell assembly 300, or any combinations thereof. The plurality of sensing electrodes may be an acoustic sensor, a sensor to detect chemical drift, a sensor to detect electrical drift, or any other suitable sensor.

No claim element herein is to be construed under the provisions of 35 U.S.C. § 112(f), unless the element is expressly recited using the phrase "means for."

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

Any references herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A method, comprising;

passing a first manufacturing electrolyte and a second manufacturing electrolyte through an electrochemical cell simultaneously by:

pumping the first manufacturing electrolyte through a first electrode chamber around a negative electrode substrate of the electrochemical cell;

pumping the second manufacturing electrolyte through a second electrode chamber around a positive electrode substrate of the electrochemical cell; and applying a first electrical signal to the electrochemical cell to electrochemically fabricate a negative active material on the negative electrode substrate, and to electrochemically fabricate a positive active material on the positive electrode substrate.

2. The method of claim 1, wherein at least one of the negative active material and the positive active material comprises Pb, $PbO_2$, or a combination thereof.

3. The method of claim 1, further comprising, after formation of the negative active material and the positive active material, pumping a charge operation electrolyte through the electrochemical cell while applying a second electrical signal to the electrochemical cell to charge the electrochemical cell.

4. The method of claim 3, further comprising, after pumping the charge operation electrolyte:

switching the electrochemical cell to an open circuit voltage; and flowing from a reservoir an open circuit electrolyte through the electrochemical cell, the open circuit electrolyte having a concentration providing a non-equilibrium steady state in the electrochemical cell, thereby dispensing the charge operation electrolyte out of the electrochemical cell.

5. The method of claim 3, further comprising, after pumping the charge operation electrolyte, pumping a first regeneration electrolyte through the first electrode chamber around the negative electrode substrate of the electrochemical cell and pumping a second regeneration electrolyte through the second electrode chamber around the positive electrode substrate of the electrochemical cell, wherein the first regeneration electrolyte is configured to remove spent active material from the negative electrode substrate and the second regeneration electrolyte is configured to remove spent active material from the positive electrode substrate.

6. The method of claim 5, wherein the first regeneration electrolyte comprises:

water in a concentration of about 0.01 vol % to about 99.999 vol %;

an alkaline solution or an acid in a concentration of about 0.01 vol % to about 99.999 vol %; and wherein the acid comprises sulfuric acid, nitric acid, methane sulfonic acid, or a combination of two or more thereof.

7. The method of claim 6, wherein the second regeneration electrolyte comprises:

water in a concentration of about 0.01 vol % to about 99.999 vol %;

an alkaline solution or an acid in a concentration of about 0.01 vol % to about 99.999 vol %; and wherein the acid comprises sulfuric acid, nitric acid, methane sulfonic acid, or a combination of two or more thereof.

8. The method of claim 5, further comprising, after removal of the spent active material, pumping the first manufacturing electrolyte through the first electrode chamber around the negative electrode substrate;

pumping the second manufacturing electrolyte through the second electrode chamber around the positive electrode substrate; and applying the first electrical signal to the electrochemical cell to electrochemically refabricate the negative active material on the negative electrode substrate, and to electrochemically refabricate the positive active material on the positive electrode substrate.

9. The method of claim 1, wherein at least one of the first manufacturing electrolyte or the second manufacturing electrolyte comprises one or more of sulfuric acid, nitric acid, or methane sulfonic acid in a concentration in a range of 0.01% to 99.99%.

10. The method of claim 1, wherein at least one of the first manufacturing electrolyte or the second manufacturing electrolyte comprises lead ions in a concentration in a range of 0.01 mM to 1 M.

11. The method of claim 1, wherein pumping the first manufacturing electrolyte through the first electrode chamber comprises flowing the first manufacturing electrolyte through the first electrode chamber at a rate of 0.001 liters/minute/cm$^2$ to 100 liters/minute/cm$^2$.

12. The method of claim 1, wherein pumping the second manufacturing electrolyte through the second electrode chamber comprises flowing the second manufacturing electrolyte through the second electrode chamber at a rate of 0.001 liters/minute/cm$^2$ to 100 liters/minute/cm$^2$.

13. An electrochemical cell assembly comprising:

an electrochemical cell comprising a negative electrode substrate;

a first electrolyte reservoir fluidically coupled with the electrochemical cell, the first electrolyte reservoir comprising a first manufacturing electrolyte to electrochemically formulate active material on the negative electrode substrate, forming a negative electrode;

a second electrolyte reservoir fluidically coupled with the electrochemical cell, the second electrolyte reservoir comprising a charge operation electrolyte to facilitate reduction at the negative electrode during charging of the electrochemical cell; and a third electrolyte reservoir fluidically coupled with the electrochemical cell, the third electrolyte reservoir comprising a discharge operation electrolyte to facilitate oxidation at the negative electrode during discharging of the electrochemical cell.

14. The electrochemical cell assembly of claim 13, wherein the electrochemical cell comprises:

the negative electrode substrate disposed within a first electrode chamber; and a positive electrode substrate disposed within a second electrode chamber.

15. The electrochemical cell assembly of claim 14, further comprising a fourth electrolyte reservoir fluidically coupled with the electrochemical cell, the fourth electrolyte reservoir comprising a second manufacturing electrolyte, wherein the second manufacturing electrolyte is formulated to electrochemically fabricate an active material on the positive electrode substrate.

16. The electrochemical cell assembly of claim 15, further comprising a pump assembly configured to pump the first manufacturing electrolyte through the first electrode chamber and pump the second manufacturing electrolyte through the second electrode chamber.

17. The electrochemical cell assembly of claim 15, further comprising a fifth electrolyte reservoir fluidically coupled with the electrochemical cell, the fifth electrolyte reservoir comprising a regeneration electrolyte configured to remove a spent active material from one or both of the positive electrode substrate and the negative electrode substrate.

18. The electrochemical cell assembly of claim 17, wherein the regeneration electrolyte comprises:

water in a concentration of about 0.01 vol % to about 99.999 vol %;

an alkaline solution or an acid in a concentration of about 0.01 vol % to about 99.999 vol %; and wherein the acid comprises sulfuric acid, nitric acid, methane sulfonic acid, or a combination of two or more thereof.

19. The electrochemical cell assembly of claim 15, wherein at least one of the first manufacturing electrolyte or the second manufacturing electrolyte comprises lead ions in a concentration in a range of 0.01 mM to 1 M.

20. The electrochemical cell assembly of claim 15, wherein at least one of the first manufacturing electrolyte or the second manufacturing electrolyte comprises acid in a concentration of about 0.01 vol % to about 99.999 vol %.

\* \* \* \* \*